United States Patent
Kim et al.

(10) Patent No.: US 10,468,660 B2
(45) Date of Patent: Nov. 5, 2019

(54) SECONDARY BATTERY

(71) Applicant: SAMSUNG SDI CO., LTD., Yongin-si, Gyeonggi-do (KR)

(72) Inventors: Taegon Kim, Yongin-si (KR); Andrew Kim, Yongin-si (KR); Youngkwang Yun, Yongin-si (KR); Joonsup Kim, Yongin-si (KR); Jaehyung Kim, Yongin-si (KR); Hoseong Kim, Yongin-si (KR); Kichul Ham, Yongin-si (KR); Minhee Lee, Yongin-si (KR); Daesung Ro, Yongin-si (KR); Jaehee Ha, Yongin-si (KR); Junhyung Lee, Yongin-si (KR); Jungmin Kang, Yongin-si (KR); Junggun Lim, Yongin-si (KR); Jaehee Kyoung, Yongin-si (KR); Jinwoo Kim, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 371 days.

(21) Appl. No.: 15/204,882

(22) Filed: Jul. 7, 2016

(65) Prior Publication Data

US 2017/0018756 A1 Jan. 19, 2017

(30) Foreign Application Priority Data

Jul. 16, 2015 (KR) .......................... 10-2015-0101109

(51) Int. Cl.
*H01M 2/32* (2006.01)
*H01M 10/04* (2006.01)
*H01M 2/02* (2006.01)
*H01M 2/08* (2006.01)
*H01M 2/26* (2006.01)
*H01M 2/06* (2006.01)

(52) U.S. Cl.
CPC .......... *H01M 2/32* (2013.01); *H01M 2/0285* (2013.01); *H01M 2/06* (2013.01); *H01M 2/263* (2013.01); *H01M 10/0431* (2013.01)

(58) Field of Classification Search
CPC ........................................................ H01M 2/06
See application file for complete search history.

(56) References Cited

U.S. PATENT DOCUMENTS

| 6,475,674 | B2 * | 11/2002 | Xing | H01M 2/08 |
| | | | | 429/178 |
| 2002/0031703 | A1 * | 3/2002 | Kameyama | H01M 2/0212 |
| | | | | 429/162 |

(Continued)

FOREIGN PATENT DOCUMENTS

| JP | 2008-251410 A | 10/2008 |
| KR | 2002-0039097 A | 5/2002 |
| KR | 10-2005-0066120 A | 6/2005 |

(Continued)

*Primary Examiner* — Stephan J Essex
(74) *Attorney, Agent, or Firm* — Lewis Roca Rothgerber Christie LLP

(57) ABSTRACT

A secondary battery includes: an electrode assembly; a case accommodating the electrode assembly; an electrode tab extending from the electrode assembly; a sealing part for insulating the electrode tab from the case; and an insulation film around the electrode tab and between the sealing part and the electrode assembly.

17 Claims, 11 Drawing Sheets

(56) References Cited

U.S. PATENT DOCUMENTS

2007/0231701 A1* 10/2007 Lee .................. H01M 2/18
                                                    429/246
2009/0258290 A1    10/2009 Lee et al.

FOREIGN PATENT DOCUMENTS

| KR | 10-2007-0096280 A | 10/2007 |
| KR | 10-2008-0038465 A | 5/2008 |
| WO | WO 02/41437 A1 | 5/2002 |

* cited by examiner

SECONDARY BATTERY

CROSS-REFERENCE TO RELATED APPLICATION

This application claims priority to, and the benefit of, Korean Patent Application No. 10-2015-0101109, filed on Jul. 16, 2015, in the Korean Intellectual Property Office, the disclosure of which is incorporated herein in its entirety by reference.

BACKGROUND

1. Field

One or more exemplary embodiments of the present invention relate to a secondary battery.

2. Description of the Related Art

Secondary batteries are used in various industrial fields owing to their many advantages. For example, secondary batteries are widely used as energy sources in mobile electronic devices, such as digital cameras, cellular phones, and laptop computers, as well as hybrid electric vehicles, to thereby solve problems, such as air pollution caused by internal combustion engine vehicles that use fossil fuels including gasoline and diesel oil.

SUMMARY

One or more exemplary embodiments of the present invention include a secondary battery that is configured to prevent or reduce corrosion caused by contact between an electrode tab and a case.

Additional aspects are set forth in part in the description that follows and, in part, will be apparent from the description, or may be learned by practice of the presented embodiments.

According to one or more exemplary embodiments of the present invention, a secondary battery includes: an electrode assembly; a case accommodating the electrode assembly; an electrode tab extending from the electrode assembly; a sealing part for insulating the electrode tab from the case; and an insulation film around the electrode tab and between the sealing part and the electrode assembly.

In some embodiments, the insulation film may extend into the electrode assembly through an end of the electrode assembly along a length direction of the electrode tab.

In some embodiments, the insulation film may include a recessed portion facing the electrode assembly that may be inwardly recessed with respect to a width direction of the insulation film.

In some embodiments, the recessed portion may be gradually recessed in the width direction of the insulation film.

In some embodiments, the recessed portion may be recessed in a stepped shape in the width direction of the insulation film.

In some embodiments, the insulation film may include recessed portions at both sides of the insulation film in the width direction of the insulation film.

In some embodiments, the electrode tab may be at a winding center region of the electrode assembly.

In some embodiments, the insulation film may include recessed portions at both sides of the insulation film next to an end of the winding center region.

In some embodiments, the insulation film may be integral with the sealing part and may extend from the sealing part.

In some embodiments, the electrode tab may include a first electrode tab and a second electrode tab that have different polarities.

In some embodiments, the first electrode tab may include nickel or copper, the case may include a thin aluminum plate, and the insulation film may be around the first electrode tab.

In some embodiments, the first and second electrode tabs may be at a winding center region of the electrode assembly, and may be spaced from each other.

In some embodiments, the sealing part may include a one-piece sealing part that insulates the first and second electrode tabs.

In some embodiments, the insulation film may include a first insulation film and a second insulation film that may be respectively around the first and second electrode tabs, and that may be integrally formed with each other.

In some embodiments, the insulation film may integral with the sealing part and may extend from the sealing part.

In some embodiments, the first and second insulation films may include recessed portions at ends of the first and second insulation films facing the electrode assembly that may be inwardly recessed in a width direction of the first and second insulation films.

In some embodiments, the recessed portions may be fat both sides of each of the first and second insulation films in the width direction of the first and second insulation films.

In some embodiments, the recessed portions may be at sides of the first and second insulation films next to ends of a winding center region of the electrode assembly.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
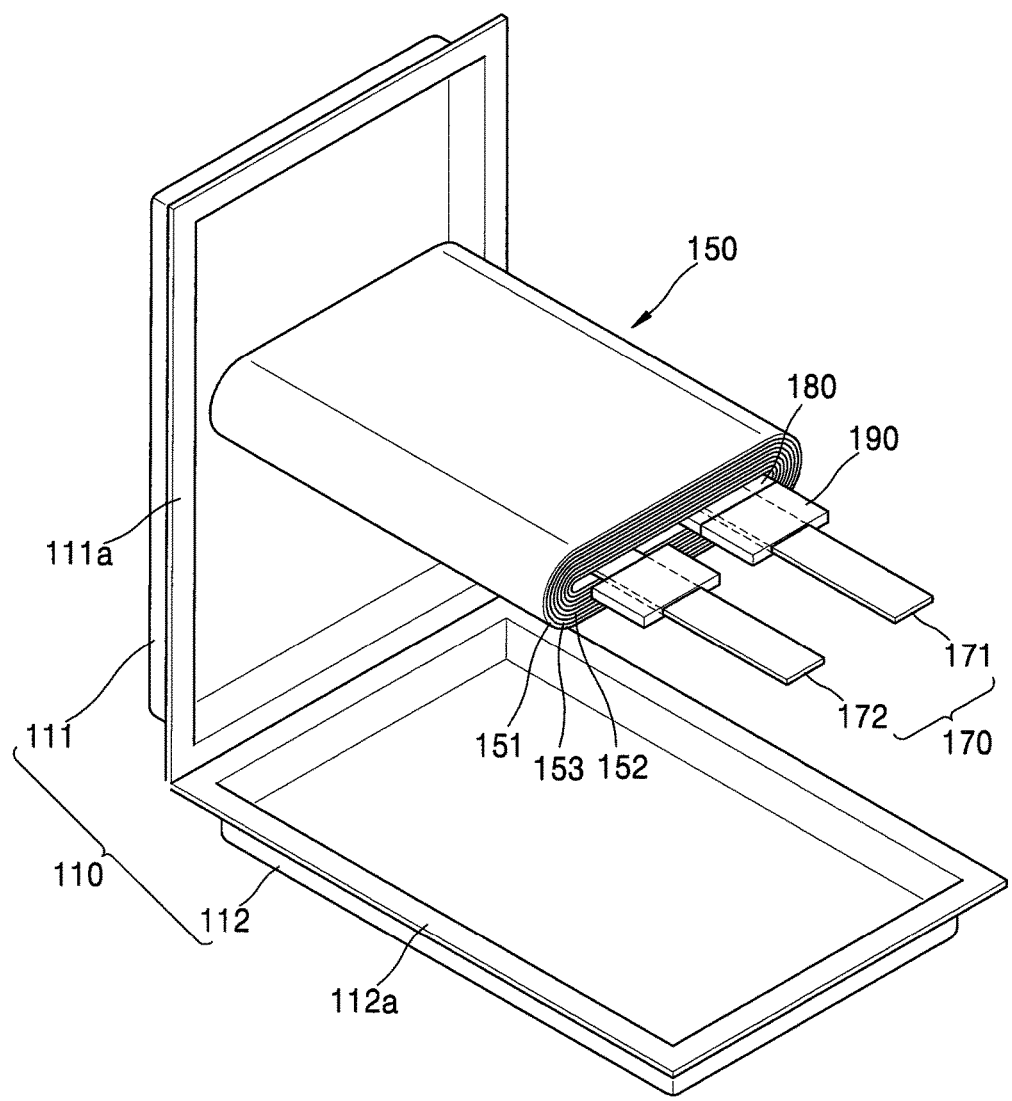
FIG. 1 is an exploded perspective view illustrating a secondary battery according to one or more exemplary embodiments of the present invention.

Reference is made herein to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present invention. As used herein, the term "and/or" includes any and all combinations of one or more of the associated listed items.

Hereinafter, a secondary battery is described with reference to the accompanying drawings, in which exemplary embodiments are shown. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 2:
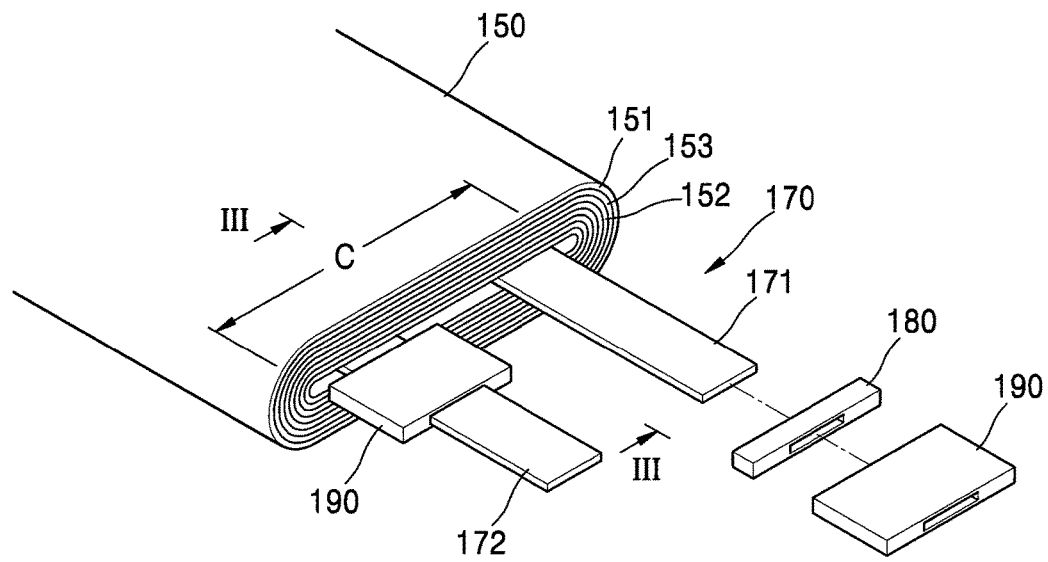
FIG. 2 is a partial exploded perspective view illustrating some elements of the secondary battery illustrated in FIG. 1.
Figure 3:
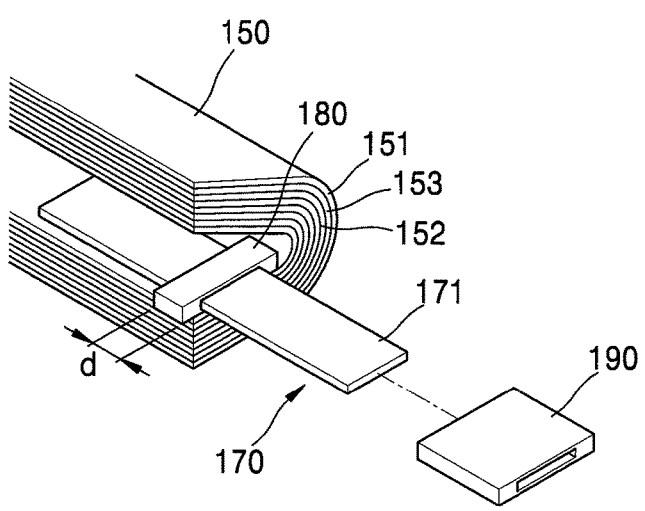
FIG. 3 is a cross-sectional view taken along line the III-III of FIG. 2.
Figure 4:
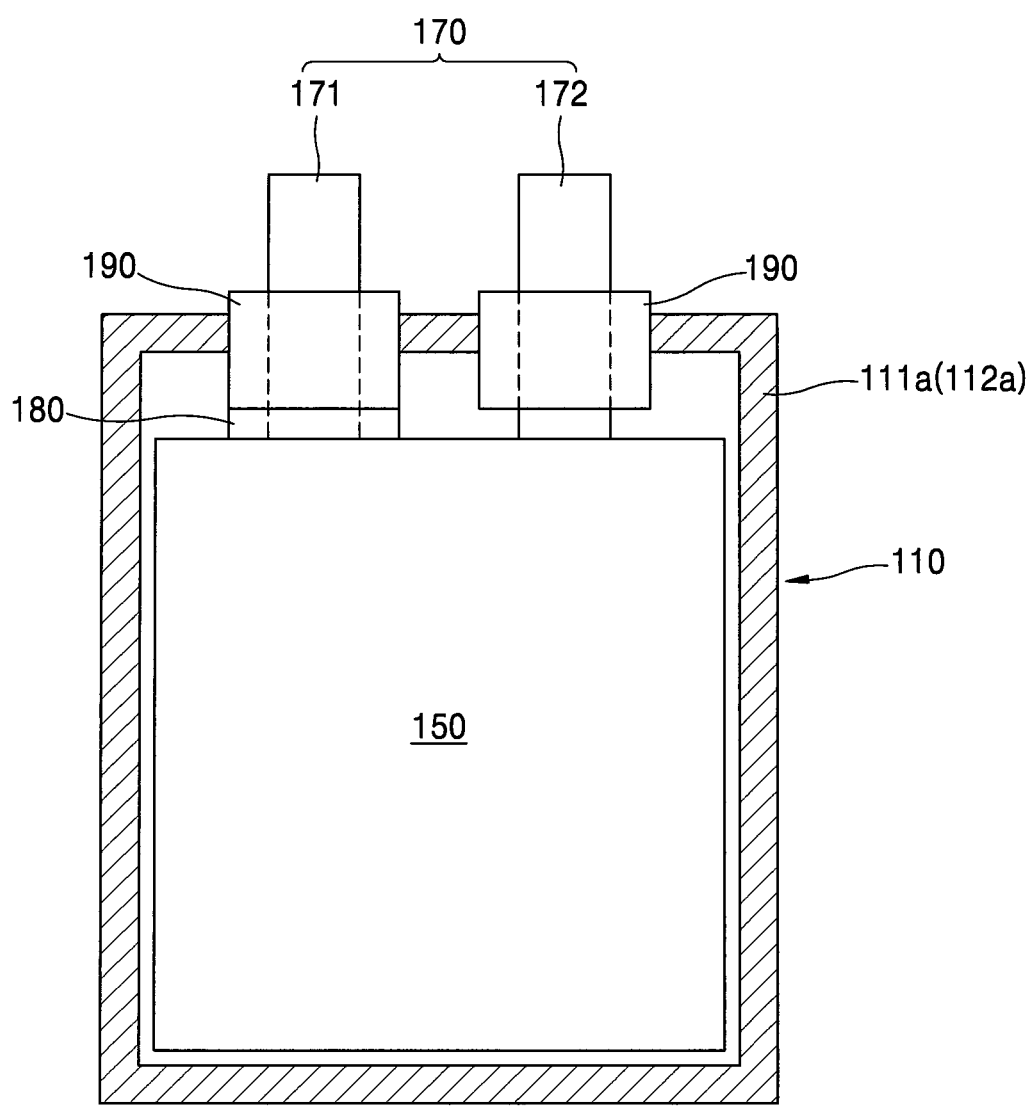
FIG. 4 is a plan view illustrating the secondary battery illustrated in FIG. 1.
Figure 5:
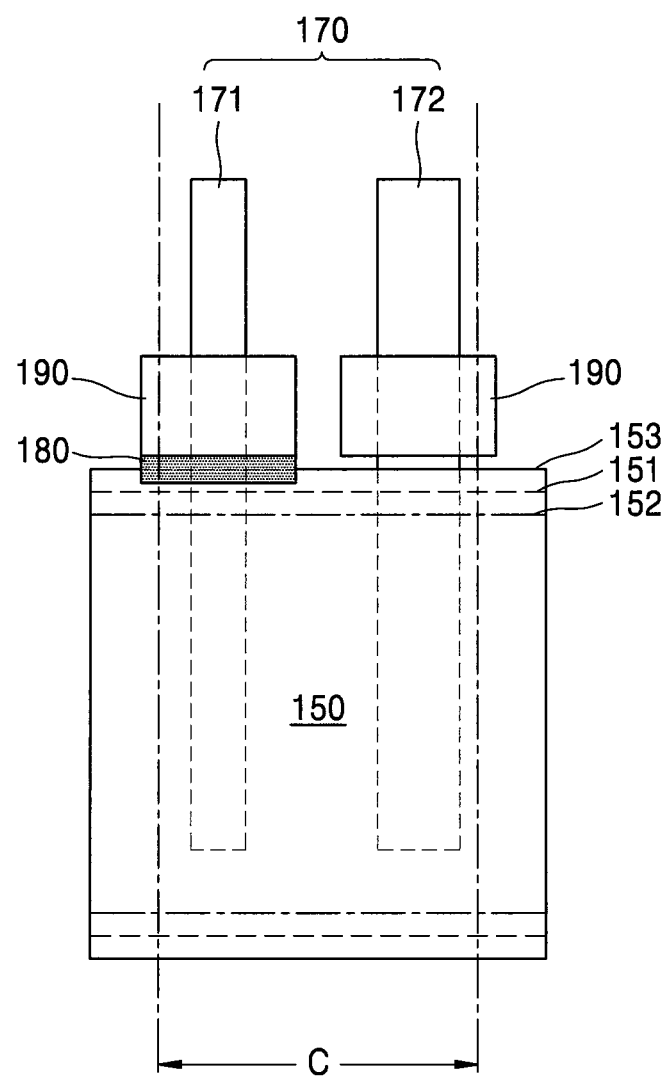
FIG. 5 is a plan view illustrating an electrode assembly of the secondary battery illustrated in FIG. 1.

FIG. 1 is an exploded perspective view illustrating a secondary battery according to one or more exemplary embodiments of the present invention, FIG. 2 is a partial exploded perspective view illustrating the secondary battery illustrated in FIG. 1, FIG. 3 is a cross-sectional view taken along the line of FIG. 2, FIG. 4 is a plan view illustrating the secondary battery illustrated in FIG. 1, and FIG. 5 is a plan view illustrating an electrode assembly 150 of the secondary battery illustrated in FIG. 1.

Referring to FIGS. 1 to 5, the secondary battery includes the electrode assembly 150, an electrode tab(s) 170 electrically connected to, and extending from, the electrode assembly 150, and a case 110 accommodating the electrode assembly 150. The case 110 may include a first case (e.g., a first case half) 111 and a second case (e.g., a second case half) 112, and the first and second cases 111 and 112 may be joined together in mutually facing directions with the electrode assembly 150 being therebetween. The first and second cases 111 and 112 may respectively include joining surfaces 111a and 112a that face each other, and sealing parts 190 may be disposed around the electrode tab(s) 170 extending from the electrode assembly 150 to insulate the electrode tab(s) 170 from the joining surfaces 111a and 112a.

The electrode assembly 150 may be a jelly-roll type electrode assembly formed by placing a separator 153 between first and second electrode plates 151 and 152, and by winding the first and second electrode plates 151 and 152 in the form of a roll. In some exemplary embodiments, the electrode assembly 150 may be a stacked-type electrode assembly, in which first and second electrode plates 151 and 152 are sequentially stacked with separators 153 between the first and second electrode plates 151 and 152. It will be appreciated that the capacity of the secondary battery having a stacked-type electrode assembly may be increased by increasing the number of electrode plates.

The electrode tab(s) 170 may be electrically connected to the first and second electrode plates 151 and 152. For example, the electrode tabs 170 may include a first electrode tab 171 and a second electrode tab 172 that are respectively electrically connected to the first and second electrode plates 151 and 152. The electrode tab(s) 170 may include a metallic material having a high degree of conductivity. For example, the first electrode tab 171 may include copper and/or nickel, and the second electrode tab 172 may include aluminum.

An insulation film 180 may be located around the electrode tab(s) 170 between the electrode assembly 150 and the sealing parts 190. For example, the insulation film 180 may extend in a length direction of the electrode tab(s) 170 into the electrode assembly 150 across an end (e.g., a front end) of the electrode assembly 150. As shown in FIG. 3, the insulation film 180 may be inserted into the electrode assembly 150 to a depth (e.g., a predetermined depth) d in the length direction.

The electrode assembly 150 includes the first and second electrode plates 151 and 152 having different polarities, and the separator 153 between the first and second electrode plates 151 and 152. Side edges of the first and second electrode plates 151 and 152 and the separator 153 may be exposed at the front end of the electrode assembly 150 with respect to the length direction of the electrode tab(s) 170.

As shown in FIG. 5, the side edge of the separator 153 may be exposed to a greater degree than the side edges of the first and second electrode plates 151 and 152. In other words, the side edge of the separator 153 may protrude farther than the side edges of the first and second electrode plates 151 and 152. Further, the insulation film 180 may extend in the length direction of the electrode tab(s) 170 into the electrode assembly 150 across the front end of the electrode assembly 150, that is, across the side edge of the separator 153. The insulation film 180 may cover the electrode tab(s) 170, and may reduce or prevent contact between the case 110 and the electrode tab(s) 170, thereby reducing or preventing corrosion of the electrode tab(s) 170 that may be caused by contact with the case 110.

For example, the insulation film 180 may cover a portion of the electrode tab(s) 170 that is exposed from the separator 153 to reduce or prevent contact between the exposed portion of the electrode tab(s) 170 and the case 110. As such, the insulation film 180 may be between the electrode tab(s) 170 and the case 110.

For example, the electrode tab(s) 170, particularly, the first electrode tab 171, may include nickel and/or copper, and the case 110 may include aluminum. As such, if the first electrode tab 171 and the case 110 including different materials are brought into contact with each other, galvanic corrosion may occur between the first electrode tab 171 and the case 110.

The first electrode tab 171 extends from the first electrode plate 151 and is exposed at the front end of the electrode assembly 150. The sealing part 190 is disposed between the case 110 and the first electrode tab 171 that is exposed from the electrode assembly 150. Thus, a portion of the first electrode tab 171 between the electrode assembly 150 and the sealing part 190 may be exposed and/or brought into contact with the case 110. However, the insulation film 180 covers the portion of the first electrode tab 171 between the electrode assembly 150 and the sealing part 190 so that the first electrode tab 171 might not be exposed to the outside and might not be brought into contact with the case 110. For example, the sealing parts 190 may be insulators surrounding the electrode tab(s) 170, and the case 110 may be on and joined to the sealing parts 190.

The sealing parts 190 may include a polymer resin for securely sealing the case 110 along stepped interfaces between the electrode tab(s) 170 and the case 110. In this case, for example, the sealing parts 190 may be thermally coupled (e.g., securely thermally coupled) to an inner layer of the case 110 while electrically insulating the case 110 from the electrode tab(s) 170 including metal layers.

In one or more exemplary embodiments of the present invention, the insulation film 180 may be attached to the first electrode tab 171 of the electrode tabs 170. However, the present invention is not limited thereto. For example, the insulation film 180 may be attached to one or both of the first and second electrode tabs 171 and 172.

Referring to FIG. 5, the electrode tab(s) 170 may be located in (or at) a winding center region C of the electrode assembly 150. The term "winding center region C" may refer to an empty region in which the electrode tab(s) 170 are located, and around which the electrode assembly 150 is wound in a roll shape. In other words, the winding center region C is an empty region (e.g., a hollow core) in which the first and second electrode plates 151 and 152 and the separator 153 of the electrode assembly 150 are not present. The electrode tab(s) 170 may be disposed in the winding center region C.

Figure 6:
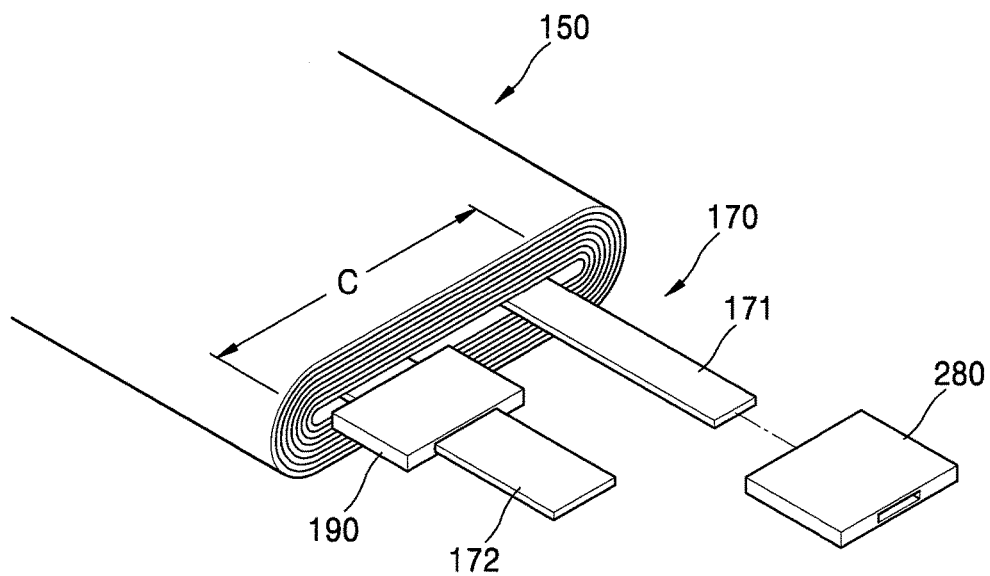
FIG. 6 is a partial exploded perspective view illustrating some elements of a secondary battery according to one or more exemplary embodiments of the present invention.

FIG. 6 is a partial exploded perspective view illustrating some elements of a secondary battery according to one or more exemplary embodiments of the present invention.

As illustrated in FIG. 6, in some embodiments, an insulation film 280 may be formed integrally (or in one piece) with a sealing part (e.g., like the sealing parts 190 of FIGS. 1 to 5). For example, as shown in FIG. 6, the insulation film 280 may extend in the length direction of the electrode tabs 170 into the electrode assembly 150 across the front end of the electrode assembly 150. For example, the insulation film 280 may cover portions of the electrode tab(s) 170 that are exposed from, or located outside of, the electrode assembly 150, and may reduce or prevent corrosion of the electrode tab(s) 170, which may be caused by contact with the case 110. The insulation film 280 and the sealing part may be integrally formed. For example, the insulation film 280 may function as a sealing part for the case 110, and may cover the electrode tab(s) 170, while also extending in the length direction of the electrode tab(s) 170 into the electrode assembly 150 and across the front end of the electrode assembly 150. As such, because the insulation film 280 functions as a sealing part for the case 110, the insulation film 280 may include an insulative material that may be thermally fused to the case 110.

Figure 7:
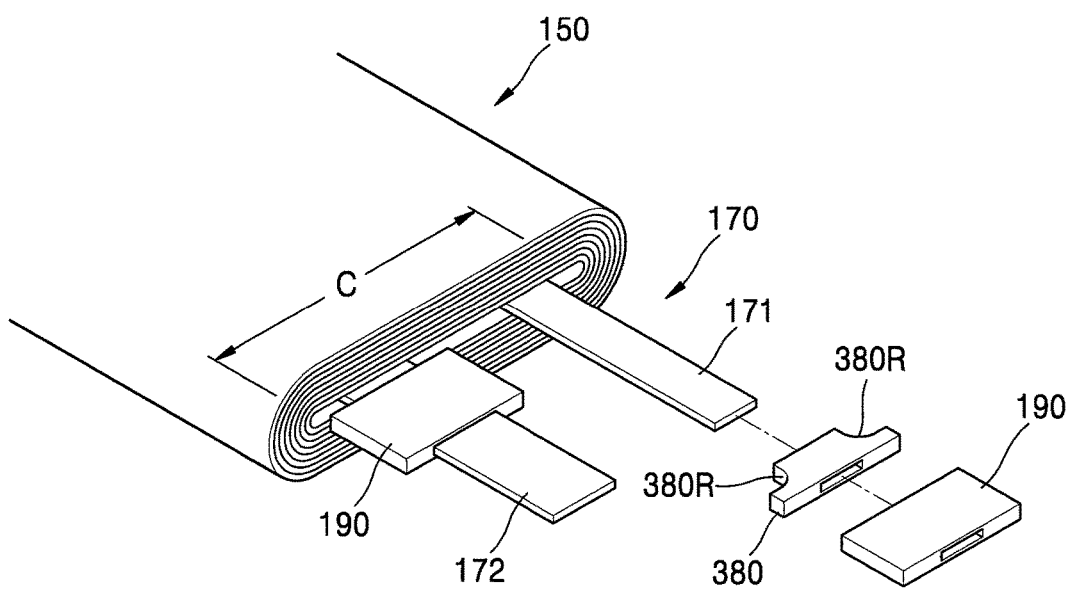
FIG. 7 is a partial exploded perspective view illustrating some elements of a secondary battery according to one or more exemplary embodiments of the present invention.
Figure 8:
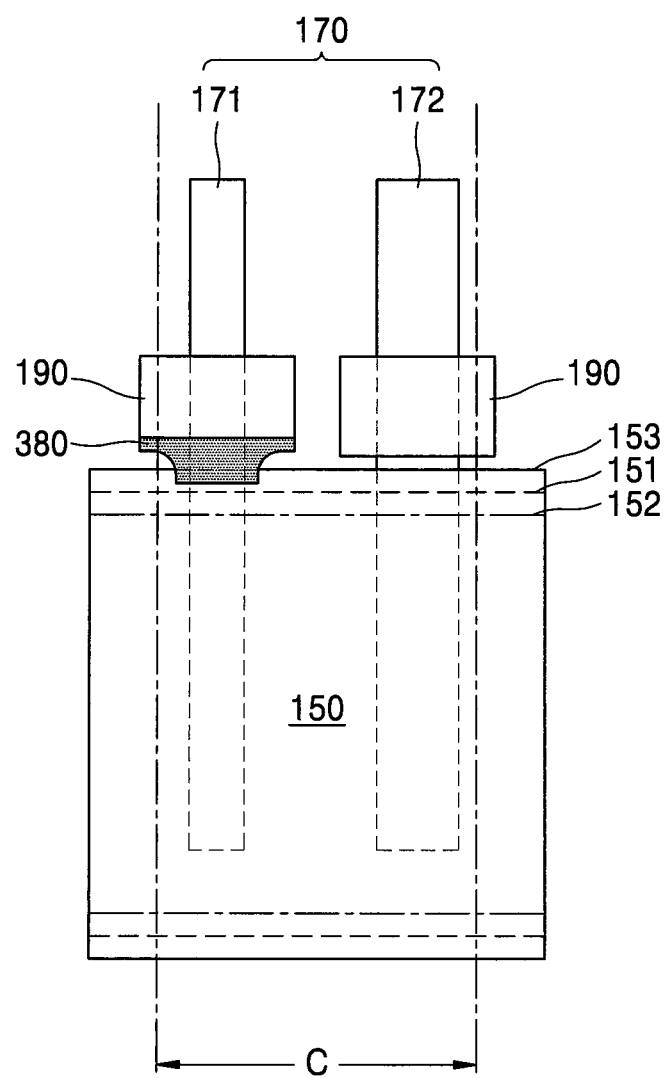
FIG. 8 is a plan view illustrating an electrode assembly of the secondary battery illustrated in FIG. 7.

FIG. 7 is a partial exploded perspective view illustrating some elements of a secondary battery according to one or more exemplary embodiments of the present invention, and FIG. 8 is a plan view of an electrode assembly of the secondary battery illustrated in FIG. 7.

Referring to FIGS. 7 and 8, recessed portions 380R may be formed at an end of an insulation film 380 facing the electrode assembly 150, thereby enabling the insulation film 380 to be more easily positioned in place. The first and second electrode plates 151 and 152 and the separator 153 that are wound a plurality of times in the form of a roll are densely located at the front end of the electrode assembly 150. Therefore, when the end of the insulation film 380 is inserted into the electrode assembly 150 through the front end of the electrode assembly 150, the insulation film 380 may physically interfere with the first and second electrode plates 151 and 152 and with the separator 153 that are densely located on the front end of the electrode assembly 150. Therefore, the recessed portions 380R are formed in the end of the insulation film 380 to narrow the width of the end of the insulative film 380 at the end to be inserted through the front end of the electrode assembly 150. As a result, the insulation film 380 may cover the electrode tab(s) 170 without exposing the electrode tab(s) 170 and without interfering with the electrode assembly 150. The recessed portions 380R may be gradually recessed in a width direction of the insulation film 380.

For example, the insulation film 380 may include two regions having different widths. In more detail, the insulation film 380 may include a relatively narrow region facing the electrode assembly 150 at which the recessed portions 380R are formed, and may include a main region opposite the electrode assembly 150 and having a comparatively large width. The recessed portions 380R of the insulation film 380 may be formed at the front end of the electrode assembly 150 (e.g., in the relatively narrow region).

The recessed portions 380R may be variously modified as long as the recessed portions 380R have a width that decreases in the length direction of the electrode tab(s) 170 toward the front end of the electrode assembly 150 (e.g., the insulation film narrows toward the front end of the electrode assembly 150). The recessed portions 380R may be inwardly recessed in a gradual shape or in stepped shape in the width direction thereof such that the width of the recessed portions 380R may decrease in the length direction of the electrode tab(s) 170. The recessed portions 380R may have a round shape, or may have an angled notch shape. In some exemplary embodiments, the recessed portions 380R may be formed at both sides of the insulation film 380 in the width direction of the insulation film 380.

In one or more exemplary embodiments, the secondary battery may be used as a power source of a very small device. As such, the size of the secondary battery may be limited to very small dimensions. As shown in FIG. 8, the first and second electrode tabs 171 and 172 may be spaced apart from each other. In this case, the joining surfaces 111a and 112a of the first and second cases 111 and 112 of the case 110 (refer to FIG. 1) may be located between the first and second electrode tabs 171 and 172, and thus the first and second cases 111 and 112 may be securely joined to each other.

For example, if the first and second electrode tabs 171 and 172 are closely arranged, and if the joining surfaces 111a and 112a of the case 110 are not located between the first and second electrode tabs 171 and 172, the joining surfaces 111a and 112a of the case 110 may be separated from each other near the first and second electrode tabs 171 and 172 that are closely arranged. That is, the joining between the joining surfaces 111a and 112a of the case 110 may not be effectively secure.

If the secondary battery has a very small size, the winding center region C of the secondary battery may be limited to a very small size. As discussed above, the term "winding center region C" may refer to an empty region in which the first and second electrode tabs 171 and 172 are disposed, and around which the electrode assembly 150 is wound in a roll shape. In other words, the winding center region C is an empty region in which the first and second electrode plates 151 and 152 and the separator 153 of the electrode assembly 150 are not disposed. The first and second electrode tabs 171 and 172 may be disposed in the winding center region C.

The first and second electrode tabs 171 and 172 may be disposed as close as possible to left and right ends of the winding center region C having a limited size, so as to ensure a gap between the first and second electrode tabs 171 and 172 for reliable joining between the joining surfaces 111a and 112a of the case 110. The recessed portions 380R of the insulation film 380 attached to the electrode tab(s) 170 may extend into the electrode assembly 150. In other words, because of the recessed portions 380R, portions of the insulation film 380 that are next to ends of the winding center region C may be inserted into the electrode assembly 150 without physical interference.

The first and second electrode tabs 171 and 172 may be at (or in) the winding center region C, such that ends of the first and second electrode plates 151 and 152, to which the first and second electrode tabs 171 and 172 are connected, may be set as the winding center region C, and such that the first and second electrode plates 151 and 152 may be wound until reaching the other ends of the first and second electrode plates 151 and 152.

Figure 9:
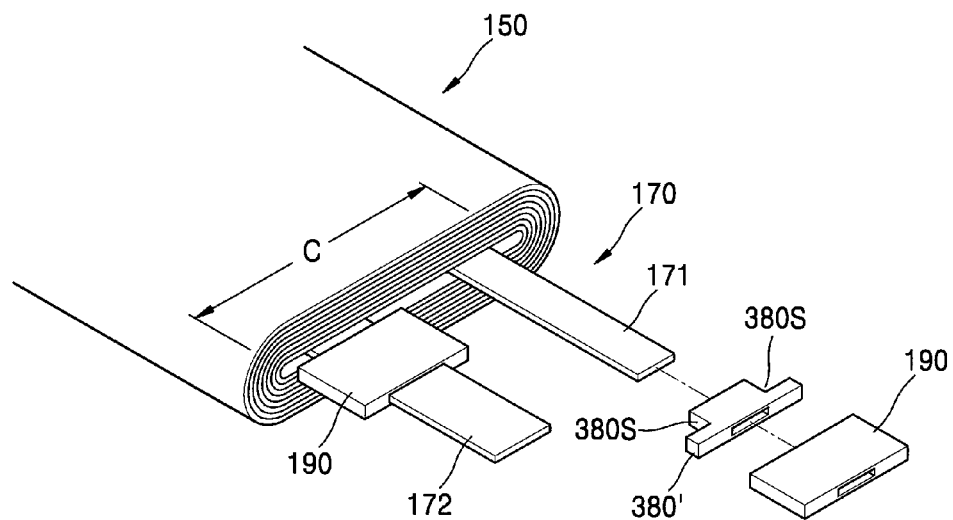
FIG. 9 is a partial exploded perspective view illustrating some elements of a secondary battery according to one or more exemplary embodiments of the present invention.

FIG. 9 is a partial exploded perspective view illustrating a secondary battery according to one or more exemplary embodiments of the present invention.

Referring to FIG. 9, in some embodiments, recessed portions 380S may be formed in an end of an insulation film 380' facing the electrode assembly 150 such that the insulation film 380' may be easily placed. The recessed portions 380S may be recessed in a stepped shape with respect to the width direction of the insulation film 380'. For example, the recessed portions 380S may have an angled notch shape (e.g., may include right-angled notches). In some embodiments, the recessed portions 380R may be formed in both sides of the insulation film 380' in the width direction of the insulation film 380'.

Figure 10:
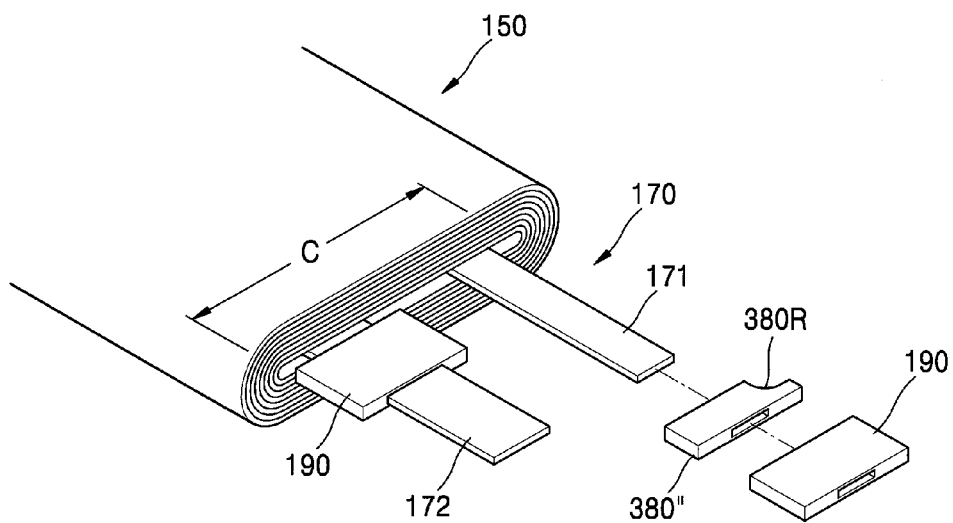
FIG. 10 is a partial exploded perspective view illustrating some elements of a secondary battery according to one or more exemplary embodiments of the present invention.

FIG. 10 is a partial exploded perspective view illustrating a secondary battery according to one or more exemplary embodiments of the present invention.

Referring to FIG. 10, in some embodiments, a recessed portion 380R may be formed in an end of an insulation film 380" facing the electrode assembly 150 such that the insulation film 380" may be easily placed (or positioned). The recessed portion 380R may be inwardly recessed in the width direction of the insulation film 380". In some embodiments, recessed portions 380R may be formed in both sides of the insulation film 380" in the width direction of the insulation film 380". For example, the recessed portion 380R may be formed in a side of the insulation film 380" adjacent to an end of the winding center region C.

For example, if the secondary battery is used as a power source of a very small device, the size of the winding center region C, in which the first and second electrode tabs 171 and 172 are disposed, is limited. Therefore, the first and second electrode tabs 171 and 172 may be respectively arranged as close as possible to left and right ends of the winding center region C to ensure a gap between the first and second electrode tabs 171 and 172 for reliable joining between the joining surfaces 111a and 112a of the case 110 at a region between the first and second electrode tabs 171 and 172. As such, the recessed portion 380R, which is a portion of the insulation film 380" adjacent an end of the winding center region C, may be inserted into the electrode assembly 150 without physical interference.

Figure 11:
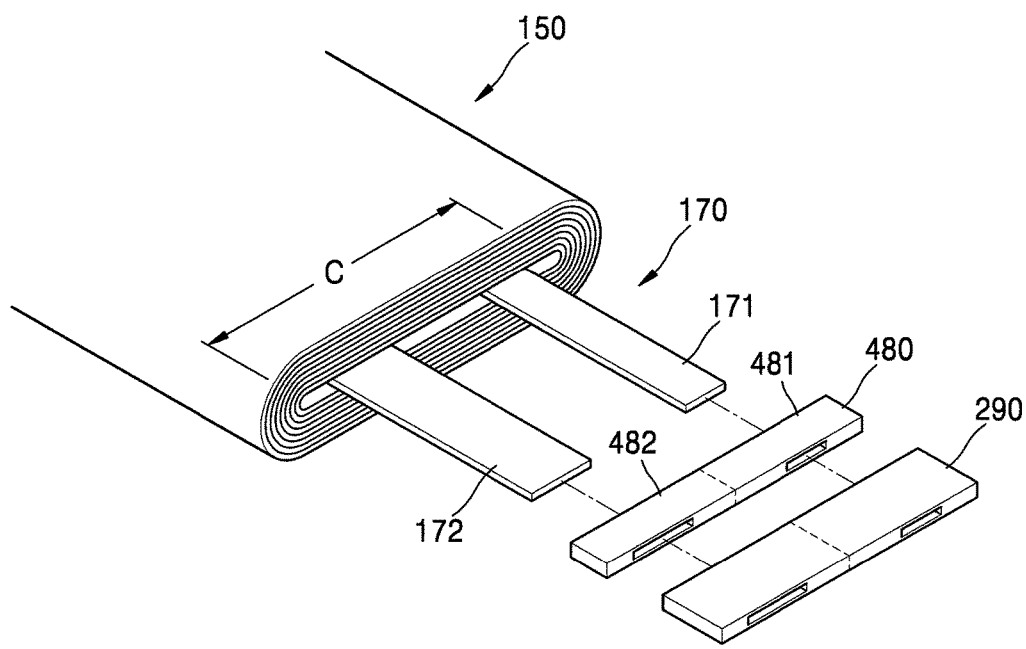
FIG. 11 is a partial exploded perspective view illustrating some elements of a secondary battery according to one or more exemplary embodiments of the present invention.

FIG. 11 is a partial exploded perspective view illustrating some elements of a secondary battery according to one or more exemplary embodiments of the present invention.

Referring to FIG. 11, in some embodiments, a one-piece sealing part 290 may be provided for the first and second electrode tabs 171 and 172. In addition, an insulation film 480 may be between the sealing part 290 and the electrode assembly 150. The insulation film 480 includes a first insulation film 481 around the first electrode tab 171, and a second insulation film 482 around the second electrode tab 172, the first and second insulation films 481 and 482 being formed as one piece (e.g., integrally formed).

If the secondary battery is used as a power source of a very small device, it may be difficult to fix the first and second electrode tabs 171 and 172 while maintaining a gap between the first and second electrode tabs 171 and 172. However, according to one or more exemplary embodiments of the present invention, a uniform gap may be maintained between the first and second electrode tabs 171 and 172 because of the one-piece sealing part 290 and the one-piece insulation film 480.

Figure 12:
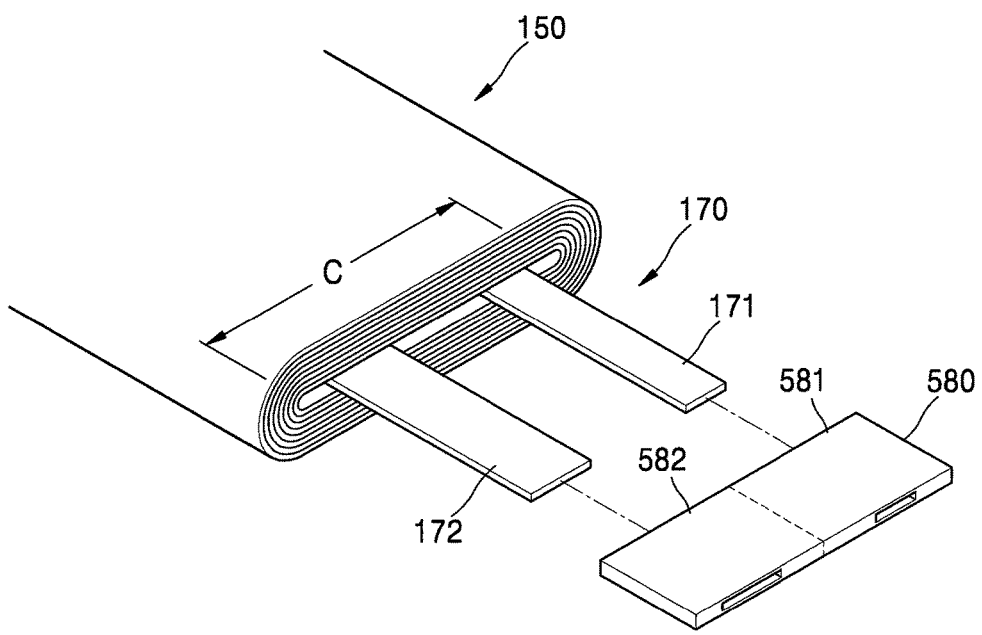
FIG. 12 is a partial exploded perspective view illustrating some elements of a secondary battery according to one or more exemplary embodiments of the present invention.

FIG. 12 is a partial exploded perspective view illustrating some elements of a secondary battery according to one or more exemplary embodiments of the present invention.

Referring to FIG. 12, in some embodiments, an insulation film 580 may be on/around the first and second electrode tabs 171 and 172. The insulation film 580 includes a first insulation film 581 and a second insulation film 582. A sealing part for sealing the case 110 is formed integrally (in one piece) with the insulation film 580, and the insulation film 580 extends from the sealing part toward the electrode assembly 150 along the length direction of the electrode tab(s) 170. The insulation film 580 covers portions of the electrode tab(s) 170 that are exposed beyond the electrode assembly 150, and the insulation film 580 thus reduces or prevents corrosion of the electrode tab(s) 170 that may be otherwise caused by contact with the case 110. Because the insulation film 580 functions as a sealing part for sealing the case 110, the insulation film 580 may include an insulative material that may be thermally fused to the case 110. The first and second insulation films 581 and 582 of the insulation film 580 are formed integrally (as one piece) for maintaining a uniform gap between the first and second electrode tabs 171 and 172.

Figure 13:
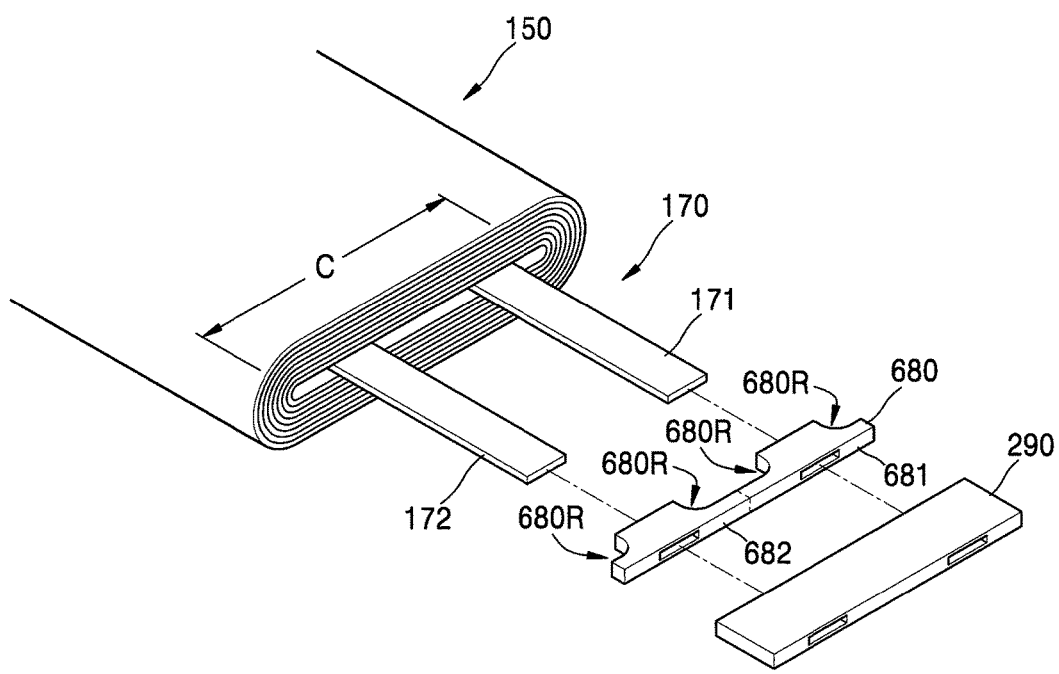
FIG. 13 is a partial exploded perspective view illustrating some elements of a secondary battery according to one or more exemplary embodiments of the present invention.
Figure 14:
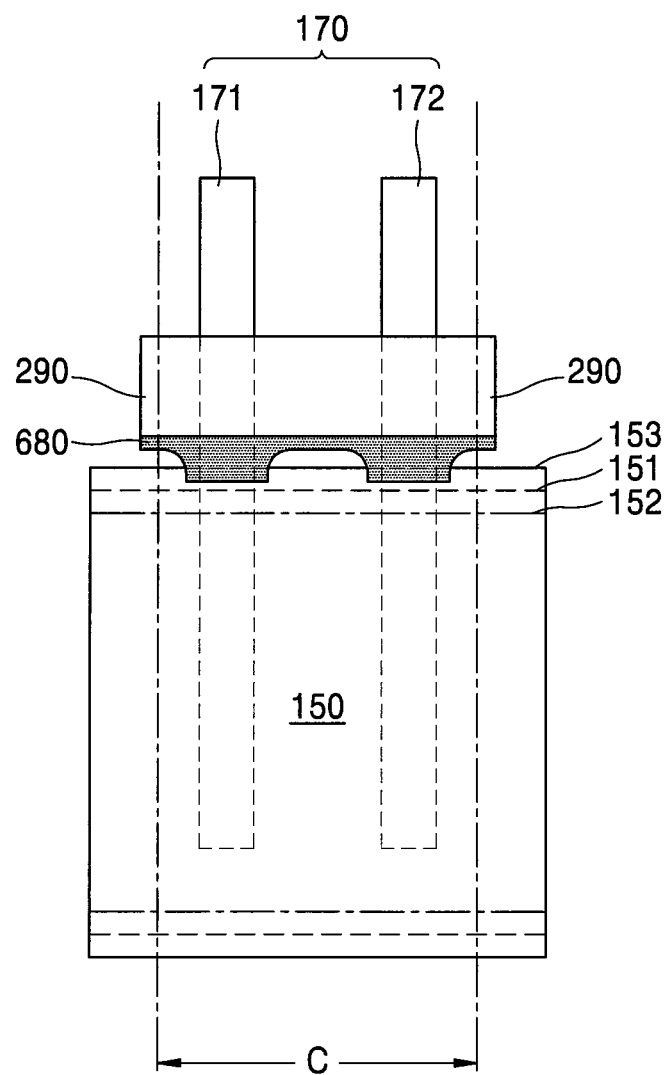
FIG. 14 is a plan view illustrating an electrode assembly of the secondary battery illustrated in FIG. 13.

FIG. 13 is a partial exploded perspective view illustrating some elements of a secondary battery according to one or more exemplary embodiments of the present invention, and FIG. 14 is a plan view of an electrode assembly of the secondary battery illustrated in FIG. 13.

Referring to FIGS. 13 and 14, in some embodiments, a one-piece sealing part 290 may be provided for the first and second electrode tabs 171 and 172. In addition, an insulation film 680 may be between the sealing part 290 and the electrode assembly 150. The insulation film 680 includes a first insulation film 681 on the first electrode tab 171, and a second insulation film 682 on the second electrode tab 172, the first and second insulation films 481 and 482 being formed integrally (as one piece).

Recessed portions 680R may be on an end of the insulation film 680 facing the electrode assembly 150 such that the insulation film 680 may be easily positioned (or placed). The recessed portions 680R may be formed in both sides of each of the first and second insulation films 681 and 682 with respect to the width direction of the first and second insulation films 681 and 682. That is, a pair of recessed portions 680R may be formed in both sides of the first insulation film 681 in the width direction of the first insulation film 681, and a pair of recessed portions 680R may be formed in both sides of the second insulation film 682 in the width direction of the second insulation film 682.

When the end of the insulation film 680 is inserted into the electrode assembly 150 through the front end of the electrode assembly 150, the insulation film 680 may physically interfere with the first and second electrode plates 151 and 152 and the separator 153, which are densely wound at the front end of the electrode assembly 150. However, because the recessed portions 680R narrow the width of the end of the insulation film 680 facing the electrode assembly 150, the insulation film 680 may cover the electrode tab(s) 170 without exposing the electrode tab(s) 170 and without interfering with the electrode assembly 150. The recessed portions 680R may be gradually recessed in the width direction of the insulation film 680.

The recessed portions 680R may be variously modified as long as the recessed portions 680R have a width that decreases in the length direction of the electrode tab(s) 170. The recessed portions 680R may be inwardly recessed in a gradual shape, or in a stepped shape, in the width direction of the insulative film 680 to form widths that decrease in the length direction of the electrode tab(s) 170 toward the electrode assembly (i.e., the insulative film 680 decreases in width toward the electrode tab(s) 170 due to the recessed portions 680R). The recessed portions 680R may have a round shape, or may have an angled notch shape, for example.

Figure 15:
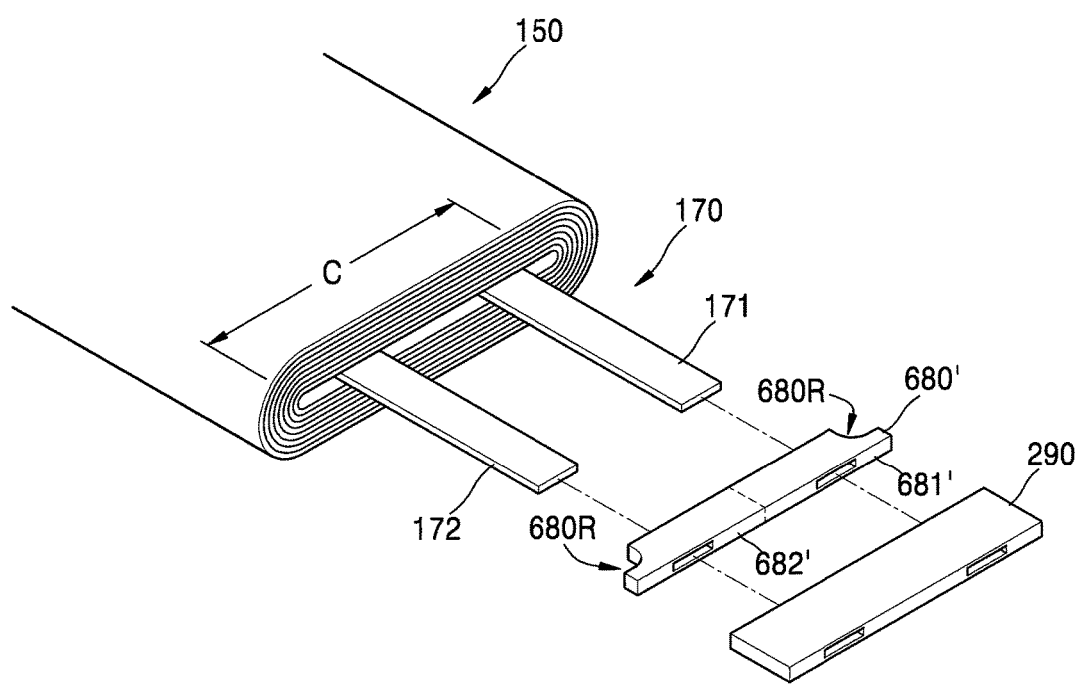
FIG. 15 is a partial exploded perspective view illustrating some elements of a secondary battery according to one or more exemplary embodiments of the present invention.

FIG. 15 is a partial exploded perspective view illustrating some elements of a secondary battery according to one or more exemplary embodiments of the present invention.

Referring to FIG. 15, in some embodiments, a one-piece sealing part 290 may be provided for the first and second electrode tabs 171 and 172. In addition, an insulation film 680' may be disposed between the sealing part 290 and the electrode assembly 150. The insulation film 680' includes a first insulation film 681' disposed on the first electrode tab 171 and a second insulation film 682' disposed on the second electrode tab 172, and the first and second insulation films 681' and 682' may be formed integrally (as one piece).

Recessed portions 680R may be formed in an end of the insulation film 680' facing the electrode assembly 150 such that the insulation film 680' may be easily positioned (or placed). The recessed portions 680R may be selectively formed in sides of the first and second insulation films 681' and 682' in the width direction of the first and second insulation films 681' and 682'. For example, the recessed portions 680R may be formed in sides of the first and second insulation films 681' and 682' adjacent both ends of the winding center region C.

For example, if the secondary battery is used as a power source of a very small device, the size of the winding center region C, in which the first and second electrode tabs 171 and 172 are disposed, is limited. Therefore, the first and second electrode tabs 171 and 172 may be respectively as close as possible to left and right ends of the winding center region C to maintain a gap between the first and second electrode tabs 171 and 172, thereby enabling reliable joining between the joining surfaces 111a and 112a of the case 110. As such, portions of the insulation film 680' next to ends of the winding center region C may be inserted into the electrode assembly 150 without physical interference because of the recessed portions 680R.

As described above, according to one or more of the above exemplary embodiments, corrosion otherwise caused by contact between the case 110 accommodating the electrode assembly 150 and the electrode tab(s) 170 extending from the electrode assembly 150 is reduced or prevented. That is, an insulation film extending into the electrode assembly 150 in the length direction of the electrode tab(s) 170 is used to cover the electrode tab(s) 170, and thus reduces or prevents corrosion otherwise caused by contact between the electrode assembly 150 and the case 110.

It should be understood that exemplary embodiments described herein should be considered in a descriptive sense and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims and their equivalents.

What is claimed is:

1. A secondary battery comprising:
    an electrode assembly comprising a first electrode plate, a second electrode plate, and a separator between the first electrode plate and the second electrode plate;
    a case accommodating the electrode assembly;
    an electrode tab extending from the electrode assembly, the electrode tab connected to an electrode plate of the first and second electrode plates and extending away from an outer edge of the electrode plate in a length direction;
    a sealing part for insulating the electrode tab from the case; and
    an insulation film around the electrode tab and between the sealing part and the electrode assembly,
    wherein the insulation film extends into the electrode assembly through an end of the electrode assembly along a direction opposite the length direction such that an edge of the insulation film is between the outer edge of the electrode plate and an outer edge of the separator along the length direction and is spaced apart from the outer edge of the electrode plate along the length direction, the outer edge of the separator and the outer edge of the electrode plate being located at the end of the electrode assembly.

2. The secondary battery of claim 1, wherein the insulation film comprises a recessed portion facing the electrode assembly that is inwardly recessed with respect to a width direction of the insulation film.

3. The secondary battery of claim 2, wherein the recessed portion is gradually recessed in the width direction of the insulation film.

4. The secondary battery of claim 2, wherein the recessed portion is recessed in a stepped shape in the width direction of the insulation film.

5. The secondary battery of claim 2, wherein the insulation film comprises recessed portions at both sides of the insulation film in the width direction of the insulation film.

6. The secondary battery of claim 2, wherein the electrode tab is at a winding center region of the electrode assembly.

7. The secondary battery of claim 6, wherein the insulation film comprises recessed portions at both sides of the insulation film next to an end of the winding center region.

8. The secondary battery of claim 1, wherein the insulation film is integral with the sealing part and extends from the sealing part.

9. The secondary battery of claim 1, wherein the electrode tab comprises a first electrode tab and a second electrode tab having different polarities.

10. The secondary battery of claim 9, wherein the first electrode tab comprises nickel or copper,
    wherein the case comprises a thin aluminum plate, and
    wherein the insulation film is around the first electrode tab.

11. The secondary battery of claim 9, wherein the first and second electrode tabs are at a winding center region of the electrode assembly, and are spaced from each other.

12. The secondary battery of claim 9, wherein the sealing part comprises a one-piece sealing part that insulates the first and second electrode tabs.

13. The secondary battery of claim 9, wherein the insulation film comprises a first insulation film and a second insulation film that are respectively around the first and second electrode tabs, and that are integrally formed with each other.

14. The secondary battery of claim 13, wherein the insulation film is integral with the sealing part and extends from the sealing part.

15. The secondary battery of claim 13, wherein the first and second insulation films comprise recessed portions at ends of the first and second insulation films facing the electrode assembly that are inwardly recessed in a width direction of the first and second insulation films.

16. The secondary battery of claim 15, wherein the recessed portions are at both sides of each of the first and second insulation films in the width direction of the first and second insulation films.

17. The secondary battery of claim 15, wherein the recessed portions are at sides of the first and second insulation films next to ends of a winding center region of the electrode assembly.

* * * * *